United States Patent Office 2,732,385
Patented Jan. 24, 1956

2,732,385

PREPARATION OF 4-BROMO STEROIDS

George R. Krsek, Espy, Pa., assignor to Merck & Co., Inc., Rahway, N. J., a corporation of New Jersey No Drawing. Application November 18, 1953, Serial No. 393,019

16 Claims. (Cl. 260—397.45)

This invention relates to a bromination process and particularly to an improved process for the catalytic bromination of steroids to produce the corresponding 4-bromo-steroids.

The discovery of the remarkable therapeutic properties of cortisone, hydrocortisone and similar related compounds has stimulated wide interest in finding simpler and more economical methods of preparing such compounds. An important step in the preparation of these hormones that usually occurs near the end of the long and involved synthesis is the introduction of a double bond between the 4 and 5 carbon atoms in the cyclopentanopolyhydrophenanthrene nucleus. One method of introducing this double bond has been the bromination of 3-keto-steroids at the 4-position followed by formation of the semicarbazone and the Δ⁴ double bond and then regeneration of the free ketone. This method has proven very effective and has therefore led to the development of various methods of brominating the 4-position of steroids. Considerable effort on the part of the steroid chemist has been expended over a period of years in an effort to improve the yield and quality of these brominated products. Variations in reaction conditions such as time, temperature and mode of addition of reactants have increased the yield of pure brominated product by small increments to approximately 70%. In order to achieve such a yield it has been necessary to treat a solution of the steroid in acetic acid with an equimolar amount of bromine in the presence of a small quantity of hydrogen bromide as a catalyst.

This bromination reaction however is a nonselective one and as such is subject to certain disadvantages with consequent complications in operations and handling and a relatively low yield. The disadvantages are therefore apparent considering that this step occurs nearly at the end of a long and involved synthesis which requires the employment of expensive starting materials, a multiplicity of chemical equipment, reagents and solvents. It is obvious therefore that any increase in yield or simplification of operations at this point in the synthesis of the various steroids is extremely advantageous. The use of hydrogen bromide as a catalyst also has a distinct disadvantage in that steroid alcohols are very sensitive to this catalyst and therefore other catalysts have been sought that will catalyze the reaction while causing a minimum of steroid destruction.

A primary object of the present invention is to provide a simplified process for the production of 4-bromo-steroids. A related object is to provide such a process which will result in nearly quantitative yields of the 4-bromo-steroids. Other objects and the advantages of this invention will be apparent from the detailed description hereinafter provided.

According to the present invention, it has been discovered that steroids and particularly 3-keto-steroids such as 3-keto-pregnanes may be brominated to produce the corresponding 4-bromo-steroid in high yield by carrying out the bromination in the presence of an organic sulfonic acid as a catalyst. It is fortuitous and surprising that sulfonic acids will effectively catalyze the bromination reaction without causing dehydration or rearrangement in other positions of the steroid molecule. This is particularly unpredictable in view of the fact that acids such as p-toluene sulfonic acid are often used as catalysts for the dehydration of steroid alcohols. The use of organic sulfonic acids as catalysts for bromination reactions are also particularly advantageous in that their use requires less equipment and greatly simplifies the reaction, as for example, the handling and weighing of these catalysts is much more readily accomplished than when using hydrogen bromide.

In accordance with one embodiment of this invention a steroid having the formula:

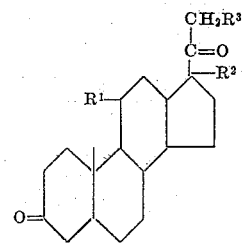

wherein R¹ represents hydrogen, hydroxy or a keto group, R² is a hydroxyl or hydrogen group and R³ is hydrogen or an acyloxy radical, is subject to bromination in the presence of an organic sulfonic acid to produce the corresponding 4-bromo-steroid.

The bromination reaction is preferably carried out by dissolving or suspending the steroid and the catalyst in a solvent such as a polar organic solvent. Typical examples of this type of solvent are acetic acid, dimethyl-acetamide, dimethyl-formamide, chloroform, and mixtures of solvents such as acetic acid-dimethylformamide, acetic acid-pyridine, and acetic acid-formamide.

The organic sulfonic acid catalyst is usually present in approximately 10 to 120 mole percent of the steroid. The term organic sulfonic acid catalyst is meant to include all the compounds formed by the substitution of a hydroxyl group of sulfuric acid with an organic radical which may be aliphatic or aromatic. Examples of such compounds are toluene sulfonic acids, naphthol-sulfonic acids, benzenesulfonic acids, naphthalene sulfonic acids and ethylsulfonic acids.

The bromine may be supplied to the reaction mixture in any suitable manner. The amount of bromine added should however be carefully controlled by the addition of approximate equimolar amounts to avoid the formation of di and tri brominated products. It is preferred to add the equimolar amount of bromine dissolved in a solvent slowly to the reaction mixture containing the steroid and catalyst. The rate of addition of the bromine is dependent to some extent on the temperature of the reaction mixture, the addition of bromine necessarily has to conform to at least the rate of reaction. It is usually preferred to add small increments of a weak base such as sodium bicarbonate or sodium acetate in the bromine solution to remove hydrogen bromide which is formed as a by-product of the reaction. This addition of a weak base is desirable to carry out the reaction in very high yield since hydrogen bromide in high concentration causes irreversible destruction of any C–17 side chain or dehydration of any 11-hydroxy group to produce a double bond at the 9:11 position.

The reaction temperature governs the rate of bromination. Thus, the rate of bromination increases at elevated temperature. It is ordinarily desired for convenience to effect the bromination at about 20 to 60° C. under normal atmospheric pressure. When the reaction is carried out at 20° C. the bromination is essentially complete in 5 to 90 minutes.

In a preferred mode of operation the steroid and 10 to 120 mole percent of p-toluene sulfonic acid as the catalyst are dissolved in acetic acid or dimethyl formamide. A solution of bromine in a similar solvent containing a small amount of sodium bicarbonate or sodium acetate is added slowly while maintaining the reaction temperature at 20° C. Under these preferred conditions the reaction is complete in 5 to 10 minutes when acetic acid is the solvent and approximately 90 minutes when dimethyl formamide is the solvent.

Although as indicated above this process is particularly applicable to the bromination of 3-keto-steroids to produce the corresponding 4-bromo-steroids it can be applied effectively to steroids which contain other functional substituents attached to the steroid nucleus. Thus, keto group may be present such as at the 11 and 20 positions, hydroxy groups at the 11, 17 and 21 positions and acyloxy groups such as at the 21 position. Representative of such steroids are pregnane-3,20-dione; pregnane-11, 17-diol-3,20-dione; pregnane-11-ol-3,20-dione; pregnane-21-ol-3, 11,20-trione-21-acetate; pregnane-11$\beta$, 17$\alpha$, 21-triol-3, 20-dione-21-acetate; and pregnane-17$\alpha$, 21-diol-3, 11, 20-trione-21-acetate.

The following examples are given for the purpose of illustration.

Example 1

A suspension of 10 grams of pregnane-21-ol-3,11,20-trione-21-acetate and 1.0 gram of p-toluene sulfonic acid was prepared in 20 cc. of dimethyl formamide at 22° C. To this, with good stirring, was added dropwise a solution of 1.325 cc. (one equivalent) of bromine in 10 cc. of dimethyl formamide. The color produced by each drop was practically gone before the next was added. All material had dissolved by the time 1.5 cc. had been added. The temperature had risen to 24° C. at the time the addition of the bromine solution was complete (1½ hours). The solution was aged five minutes and 1 cc. water added dropwise. Crystallization occurred, forming a thick paste after three minutes. Water addition was continued until a total of 200 cc. had been added and the slurry was filtered and washed free of acid with four 50 cc. portions of water and air dried to constant weight to give 11.61 grams of 4-bromopregnane 21-ol-3,11,20-trione-acetate; yield approximately 96.5% of theoretical M. P. 168.5–170.5° C. dec. The product was recrystallized to yield substantially pure product M. P. 189–190.5° C. dec. in 87.5% yield.

Example 2

A mixture of 8.08 g. of pregnane-11$\beta$, 17$\alpha$, 21-triol-3,20-dione-21-acetate in 160 ml. of acetic acid was treated with a mixture of 20 ml. of a 1.76 N bromine-acetic acid solution, 1.33 g. of sodium acetate and 0.2 g. of p-toluene sulfonic acid. Following the bromination 0.25 g. of sodium acetate in 180 ml. of water were added to the reaction mixture which was then allowed to stand overnight. The crystalline 4-bromo-pregnane-11$\beta$, 17$\alpha$, 21-triol-3,20-dione-21-acetate which separated from the reaction mixture was filtered off and dried.

Example 3

A mixture of 50 g. of pregnane-17$\alpha$, 21-diol-3,11,20-trione-21-acetate in 1 liter of acetic acid was mixed with 4.75 g. p-toluene sulfonic acid and 2.38 ml. of acetic anhydride in 25 ml. of acetic acid. To the reaction mixture was then added a solution of the following composition: 9.9 g. of sodium acetate, 6.2 ml. of bromine and 250 ml. of acetic acid. After addition of the bromine solution was complete a solution of 3.2 g. of sodium acetate and 35 ml. of acetic acid was added and the reaction mixture concentrated in vacuo to a volume of 310 ml., whereupon the 4-bromo-pregnane-17$\alpha$, 21-diol-3,11,20-trione-21-acetate crystallized from the reaction mixture. The crystalline product was separated from the reaction mixture by filtration and dried. [$\alpha$]D+96.7°. The yield, including recovery from the mother liquor, was 87.4%.

Example 4

A solution of 50.85 g. pregnane-11$\beta$, 17$\alpha$, 21-triol-3,20-dione-21-acetate in 400 ml. of acetic acid was mixed with a solution of 300 ml. of a 0.5 N solution of p-toluene sulfonic acid. A solution made up of 113 ml. acetic acid and 6.22 ml. bromine, was added to the mixture followed by the addition of 137.5 ml. of a 1 M solution of sodium acetate in acetic acid. After a short time the solution of 11.28 g. of sodium acetate in 25 ml. of water was added to the mixture. An additional 1775 ml. of water was then added whereupon crystalline 4-bromo-pregnane-11$\beta$, 17$\alpha$, 21-triol-3,20-dione-21-acetate separated from the reaction mixture. The product was filtered, washed and dried. [$\alpha$]D+95.8°. Including amounts recovered from the mother liquors and based on the amount of starting material consumed the yield of substantially pure product was 87.4%.

Example 5

As a comparison pregnane-11$\beta$, 17$\alpha$, 21-triol-3,20-dione-21-acetate was brominated according to the procedure in Example 4 except that a small amount of hydrogen bromide was used in place of the p-toluene sulfonic acid. The yield of 4-bromopregnane-11$\beta$, 17$\alpha$, 21-triol-3,20-dione-21-acetate including amounts recovered from the mother liquors and based on the amount of starting material consumed was 50 per cent.

Any departure from the above description which conforms to the present invention is intended to be included within the scope of the claims.

I claim:

1. An improved process for the monobromination of steroids which comprises reacting a steroid with bromine in the presence of p-toluene sulfonic acid as a catalyst to produce the corresponding 4-bromo-steroid.

2. The process of claim 1 wherein the reaction is carried out in the presence of a polar organic solvent.

3. An improved process for the monobromination of steroids which comprises reacting a 3-keto-steroid with bromine in the presence of p-toluene sulfonic acid as a catalyst to produce the corresponding 3-keto-4-bromo-steroid.

4. The process of claim 3 wherein the 3-keto-steroid is a 3-keto pregnane compound.

5. An improved process for the bromination of steroids which comprises reacting a steroid having the formula

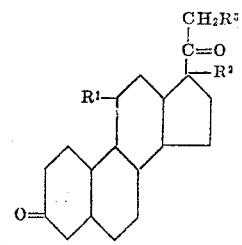

wherein $R^1$ is selected from the group consisting of hydrogen, hydroxyl and keto groups, $R^2$ is selected from the group consisting of hydrogen and hydroxyl groups and $R^3$ is selected from the group consisting of hydrogen and

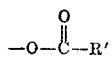

wherein R' is a hydrocarbon group containing less than nine carbon atoms with bromine in the presence of an organic sulfonic acid having the formula R—SO$_3$H wherein R is selected from the class consisting of a phenyl group and a naphthyl group as a catalyst to produce the corresponding 4-bromo-steroid.

6. The process of claim 5 wherein the steroid is pregnane-21-ol-3,11,20-trione-21-acetate.

7. The process of claim 5 wherein the steroid is pregnane-11β, 17α, 21-triol-3,20-dione-21-acetate.

8. The process of claim 5 wherein the steroid is pregnane-17α, 21-diol-3,11,20-trione-21 acetate.

9. The process of claim 5 wherein the organic sulfonic acid catalyst is present in approximately 10 to 120 mol percent of the steroid.

10. The process of claim 5 wherein the reaction is carried out in the presence of a polar organic solvent.

11. The process of claim 5 wherein the reaction is carried out in acetic acid.

12. The process of claim 5 wherein the reaction is carried out in the presence of a weak base.

13. The process of claim 12 wherein the weak base is sodium acetate.

14. The process of claim 12 wherein the weak base is sodium bicarbonate.

15. In the process wherein a 3-keto-steroid is brominated to produce the corresponding 4-bromo-3-keto-steroid, the improvement which comprises carrying out the bromination in the presence of an organic sulfonic acid having the formula $R-SO_3H$ wherein R is selected from the class consisting of a phenyl group and a naphthyl group.

16. In the process wherein a 3-keto-steroid is brominated to produce the corresponding 4-bromo-3-keto-steroid, the improvement which comprises carrying out the bromination in the presence of an organic sulfonic acid having the formula $R''-SO_3H$ wherein $R''$ is a lower alkyl group.

References Cited in the file of this patent

UNITED STATES PATENTS

| | | |
|---|---|---|
| 2,662,903 | Holysz | Dec. 15, 1953 |
| 2,674,606 | Levin | Apr. 6, 1954 |